United States Patent [19]
Ikeda

[11] Patent Number: 6,105,644
[45] Date of Patent: Aug. 22, 2000

[54] PNEUMATIC TIRE INCLUDING THREE ASYMMETRICALLY ARRANGED MAIN GROOVES

[75] Inventor: Akio Ikeda, Kobe, Japan

[73] Assignee: Sumitomo Rubber Industries, Ltd., Hyogo-ken, Japan

[21] Appl. No.: 09/013,883

[22] Filed: Jan. 27, 1998

[30] Foreign Application Priority Data

Feb. 6, 1997 [JP] Japan .................................. 9-023922

[51] Int. Cl.$^7$ ........................... B60C 11/11; B60C 111/00
[52] U.S. Cl. .................... 152/209.8; 152/209.9; 152/209.18; 152/209.28
[58] Field of Search ...................... 152/209 AS, 209 AG, 152/209 G, 209.8, 209.9, 209.18, 209.28; D12/147

[56] References Cited

U.S. PATENT DOCUMENTS

| | | |
|---|---|---|
| 4,732,194 | 3/1988 | Saneto et al. . |
| 5,291,929 | 3/1994 | Daisho et al. . |
| 5,360,043 | 11/1994 | Croyle et al. ........................ 152/209.9 |
| 5,425,406 | 6/1995 | Swift et al. . |
| 5,702,545 | 12/1997 | Toyoshima et al. . |
| 5,766,383 | 6/1998 | Hasegawa et al. . |
| 5,804,000 | 9/1998 | Shirai et al. . |

FOREIGN PATENT DOCUMENTS

| | | |
|---|---|---|
| 479762 | 4/1992 | European Pat. Off. . |
| 627332 | 12/1994 | European Pat. Off. . |
| 1-15705 | 5/1989 | Japan . |
| 2-212202 | 8/1990 | Japan . |
| 3-32906 | 2/1991 | Japan . |
| 3-121912 | 5/1991 | Japan . |
| 4-71909 | 3/1992 | Japan . |
| 5-15562 | 3/1993 | Japan . |
| 5-229310 | 9/1993 | Japan . |
| 6-57485 | 8/1994 | Japan . |
| 7-32822 | 2/1995 | Japan . |

*Primary Examiner*—Steven D. Maki
*Attorney, Agent, or Firm*—Birch, Stewart, Kolasch & Birch, LLP

[57] ABSTRACT

A pneumatic tire includes a tread portion provided with three straight main grooves extending continuously in the tire circumferential direction. The three main grooves are arranged asymmetrically about the tire equator such that an exterior main groove, which is one of the main grooves, is disposed in an exterior half, which is one half of the tread portion on one side of the tire equator. An axially inner main groove and an axially outer main groove, which are the remaining two main grooves, are disposed in an interior half which is the other half of the tread portion. Exterior oblique grooves are disposed axially outside the exterior main groove and inclined at an angle θ 1 of 45 to 70 degrees with respect to the circumferential direction of the tire. Interior oblique grooves are disposed axially outside the axially outer main groove and inclined reversely to the exterior oblique grooves at an angle θ 3 of 60 to 80 degrees with respect to the circumferential direction. Central oblique grooves are disposed between the exterior main groove and the axially inner main groove and inclined in the same direction as the exterior oblique grooves. Furthermore, between the exterior main groove and the axially inner main groove, the angle θ 2 of the central oblique grooves are in the range of 20 to 45 degrees with respect to the circumferential direction.

6 Claims, 5 Drawing Sheets

PNEUMATIC TIRE INCLUDING THREE ASYMMETRICALLY ARRANGED MAIN GROOVES

BACKGROUND OF THE INVENTION

1. Field of the Invention

The present invention relates to a pneumatic tire having circumferentially extending straight main grooves which are arranged asymmetrically about the tire equator to improve wet performance, uneven wear resistance and tire noise.

2. Description of the Related Art

In recent years, in order to improve wet performance especially during high speed running, tread patterns arranged asymmetrical about the tire equator are widely used in passenger car tires, especially high performance sport car tires.

Such asymmetrical tread patterns are disclosed in JA-P-A-1-115705, JA-P-A-3-32906, JA-P-A-7-32822, JA-P-A-3-121912, JA-P-B-5-15562 and JA-P-B-6-57485.

In general, the asymmetrical tread patterns are directionally bound. In other words, the tire has a designed rotational direction. If such tires are incorrectly installed in the reverse direction, the expected performance such as drainage, wet grip and the like can not be obtained and there is a danger of accident caused by slipping. Further, there are actual problems such that two different types of tires for use on the right side and left side of a car have to be prepared in every tire size. Thus two types of tire molds are required, which increases tire manufacturing costs, storage costs and the like.

SUMMARY OF THE INVENTION

It is therefore, an object of the present invention to provide a pneumatic tire in which an asymmetrical tread pattern is provided to improve wet performance, which pattern is however not bound directionally.

According to one aspect of the present invention, a pneumatic tire comprises:

a tread portion provided with three straight main grooves extending continuously in the tire circumferential direction, the three main grooves are arranged asymmetrically about the tire equator such that an exterior main groove, which is one of the main grooves, is disposed in an exterior half which is one half of the tread portion on one side of the tire equator, and an axially inner main groove and an axially outer main groove, which are the remaining two main grooves are disposed in an interior half which is the other half of the tread portion, exterior oblique grooves disposed axially outside the exterior main groove and inclined at an angle θ 1 of 45 to 70 degrees with respect to the circumferential direction of the tire, interior oblique grooves disposed axially outside the axially outer main groove and inclined reversely to the exterior oblique grooves at an angle θ 3 of 60 to 80 degrees with respect to the circumferential direction, central oblique grooves disposed between the exterior main groove and the axially inner main groove and inclined to the same direction as the exterior oblique grooves, between the exterior main groove and the axially inner main groove, the angle θ 2 of the central oblique grooves being in the range of 20 to 45 degrees with respect to the circumferential direction.

BRIEF DESCRIPTION OF THE DRAWINGS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiments of the present invention will now be described in detail in conjunction with the accompanying drawings in which.

DESCRIPTION OF THE PREFERRED EMBODIMENTS

Figure 1:
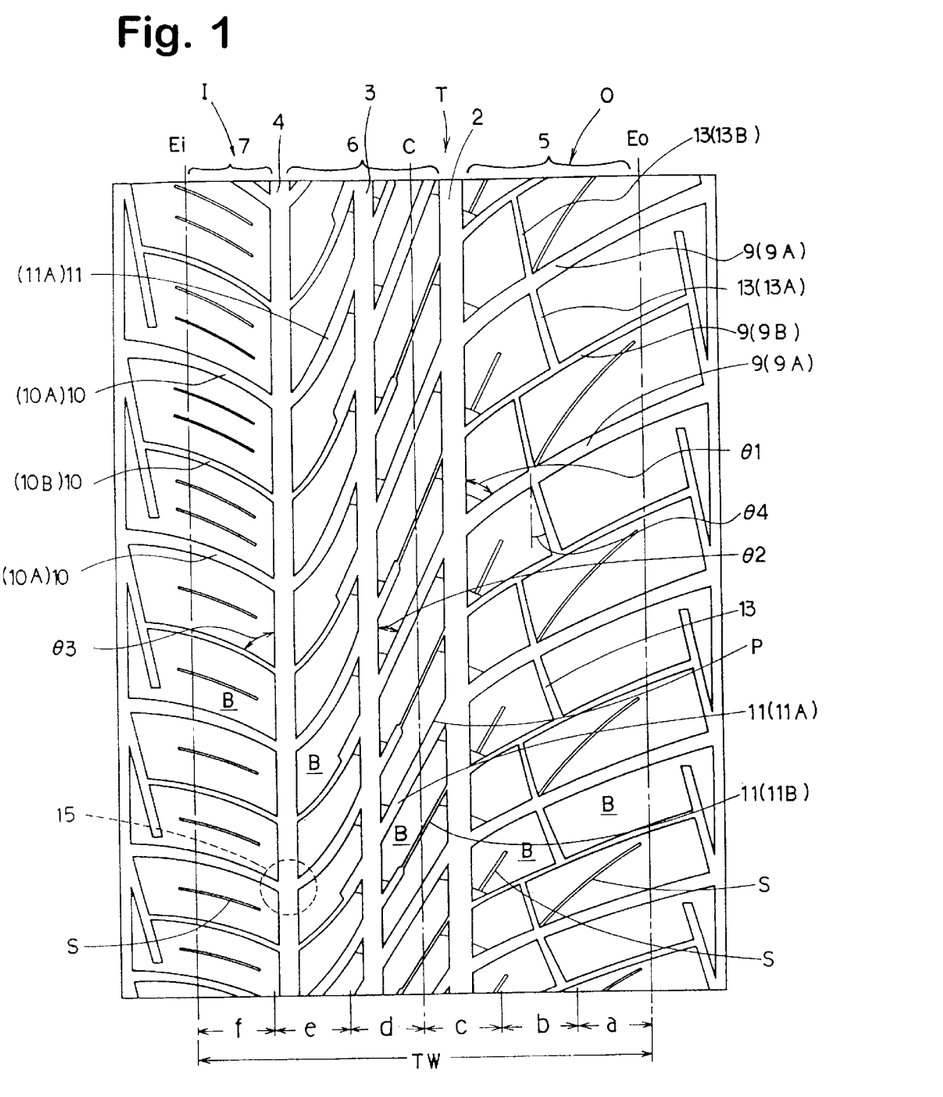
FIG. 1 is a developed plan view of an embodiment of the present invention showing an example of the tread pattern.

In FIG. 1, a tire according to the invention is a radial tire for passenger cars.

The tire has a tread portion, a pair of axially spaced bead portions, and a pair of sidewall portions extending between the tread edges and the bead portions to have a toroidal shape. The tire is reinforced by a pair of bead cores disposed one in each of the bead portions. At least one radial carcass ply extends between the bead portions, and a belt is disposed radially outside the carcass in the tread portion T.

The tread portion T is provided with a tread pattern which is not bound directionally, but positionally.

In this application, one half of the tread portion which is disposed on the outside of the vehicle (in FIG. 1 the right-hand side of the tire equator C) is called simply the "exterior half", and the other half which is disposed on the inside of the vehicle (in FIG. 1 the left-hand side) is called the "interior half".

In the exterior half O a main groove 2 (exterior main groove) is disposed. This groove 2 extends straight continuously in the tire circumferential direction.

In the interior half I, an axially inner main groove 3 (first interior main groove) and an axially outer main groove 4 (second interior main groove) are disposed. These grooves 3 and 4 extend straight continuously in the tire circumferential direction.

The exterior main groove 2 has a groove width of from 6 to 20 mm preferably not less than 7 mm at the tread surface, and a groove depth of from 5 to 15 mm preferably not less than 7 mm for good drainage. In this example, the groove width is 8.6 mm, and the groove depth is 9 mm.

The interior main grooves 3 and 4 have the same groove depth as the exterior main groove 2, but the groove width is slightly smaller than that of the exterior main groove 2. In this example, the width is 7.2 mm. It is however possible to have the same width.

The above-mentioned three grooves 2, 3 and 4 are the only grooves which extend continuously in the tire circumferential direction. No circumferential groove is disposed on the tire equator C. If there are only two circumferential main grooves, wet performance becomes poor. If there are four or more, tire noise (air column resonance noise) increases.

The exterior main groove 2 is disposed within a region (c) maintained a definite distance from the tire equator C.

As shown in FIG. 1, six regions (a, b, c, d, e and f) having a width of one sixth of the tread width TW are defined in that order from the edge Eo of the exterior half portion to the edge Ei of the interior half portion. Thus, the region (c) is defined between the tire equator C and an axial position located at one sixth of the tread width TW from the tire equator C.

The regions (a and b) where a relatively large wear energy is produced during cornering are provided with no circumferential groove. Therefore, it becomes possible to improve the steering stability and uneven wear.

In order to provide an adequate spacing between the axially inner and outer main grooves 3 and 4 and thereby to decrease the rigidity of the interior half portion I uniformly, the inner main groove 3 is disposed within the region (d) between the tire equator C and a position located at one sixth of the tread width TW from the tire equator C. The outer main groove 4 is disposed within the region (e) between the positions located at one sixth and two sixth of the tread width TW from the tire equator C. Such an arrangement is also useful in improving the wet performance.

The axial distances between the main grooves 2, 3 and 4 are set in the range of not less than 8%, preferably not less than 11%, more preferably 11 to 17% of the tread width TW so as not to excessively decrease the rigidity of the land part therebetween.

Figure 2:
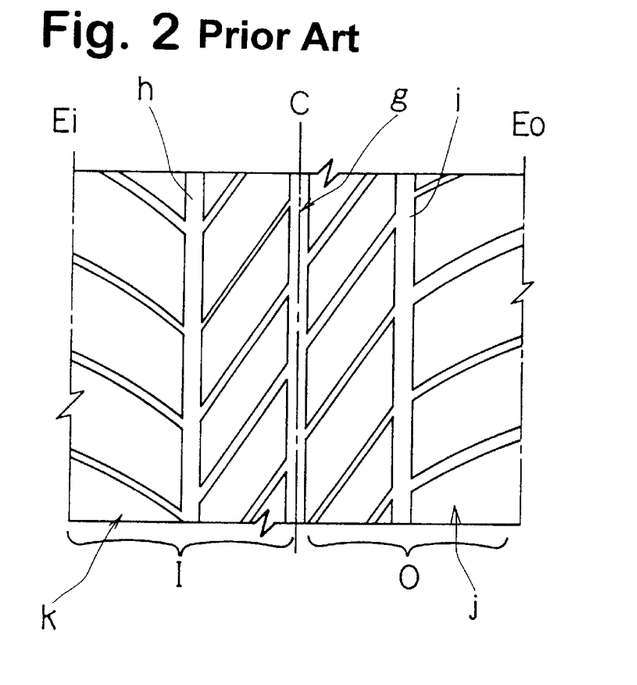
FIGS. 2 and 3 are developed plan views each showing a prior art tread pattern.

With regard to uneven wear resistance and wet performance, a tread pattern comprising three main grooves (g, h and i) arranged symmetrically about the tire equator C as shown in FIG. 2 and a tread pattern comprising three main grooves arranged asymmetrically as shown in FIG. 1 were compared, and it was found that the wet performance has no substantial difference. However, the symmetrical arrangement is poor in wear resistance such that tread wear is larger in the exterior shoulder portion (j) than the interior shoulder portion (k).

In general, wear energy produced during cornering is greater in the exterior half 0 than the interior half I. Accordingly, if there is no substantial difference in tread pattern rigidity between the interior half and the exterior half, the exterior half wears faster than the interior half.

Therefore, in the present invention, in order to decrease uneven wear, the tread pattern rigidity is increased in the exterior half O than the interior half I by employing an asymmetrical arrangement of the main grooves.

If the three main grooves 2, 3 and 4 are disposed in the interior half I, wet performance becomes poor.

According to the present invention, oblique grooves 9 (exterior oblique grooves) are disposed in a tread shoulder portion 5 (exterior shoulder portion) between the exterior main groove 2 and the exterior tread edge Eo. The exterior oblique grooves 9 are inclined at an angle θ 1 of 45 to 70 degrees to the circumferential direction.

Further, oblique grooves 10 (interior oblique grooves) are disposed in a tread shoulder portion 7 (interior shoulder portion) between the axially outer main groove 4 and the interior tread edge Ei. The interior oblique grooves 10 are inclined reversely to the exterior oblique grooves 9 at an angle θ 3 of 60 to 80 degrees to the circumferential direction.

Figure 7:
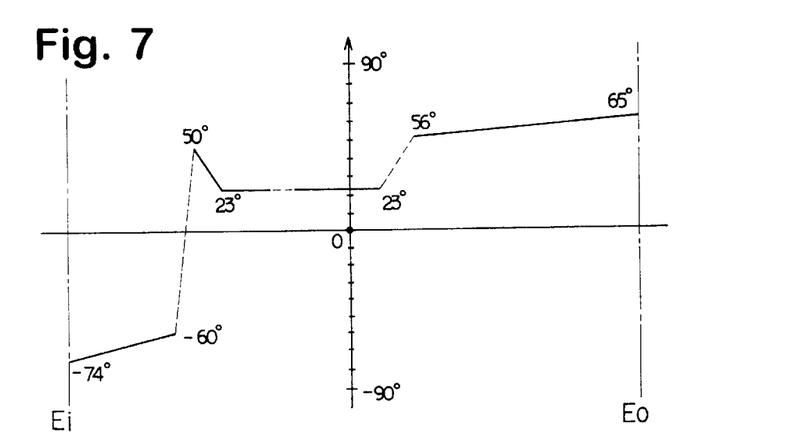
FIG. 7 is a diagram showing the angles of the oblique grooves.

Furthermore, central oblique grooves 11 are disposed in a tread crown portion 6 between the exterior main groove 2 and the axially outer main groove 4. The central oblique grooves 11 are inclined in the same direction as the exterior oblique grooves 9. The angle θ 2 of the central oblique grooves 11 is 20 to 45 degrees to the circumferential direction in a part P between the main grooves 2 and 3. The angle θ 2 increases to more than 45 degrees near the main groove 4 and thus the intersecting angle becomes more than 45 degrees. In this example, the oblique grooves 11 intersect the main groove 4 at about 50 degrees and the main groove 2 at about 23 degrees as shown in FIG. 7. However, it is also possible to gradually decrease the inclination angle from the main groove 4 to the main groove 2.

In this example, the oblique grooves 9, 10 and 11 are opened to the axially adjacent main grooves 2, 3 and 4. Thus the exterior shoulder portion 5, crown portion 6 and interior shoulder portion 7 are divided into circumferential rows of blocks B by the oblique grooves 9, 10 and 11. The interior oblique grooves 10 and central oblique grooves 11 are inclined reversely and they intersect at the position of the main groove 4 in a V-shape formation. This formation further improves drainage in the interior half portion I.

Figure 3:
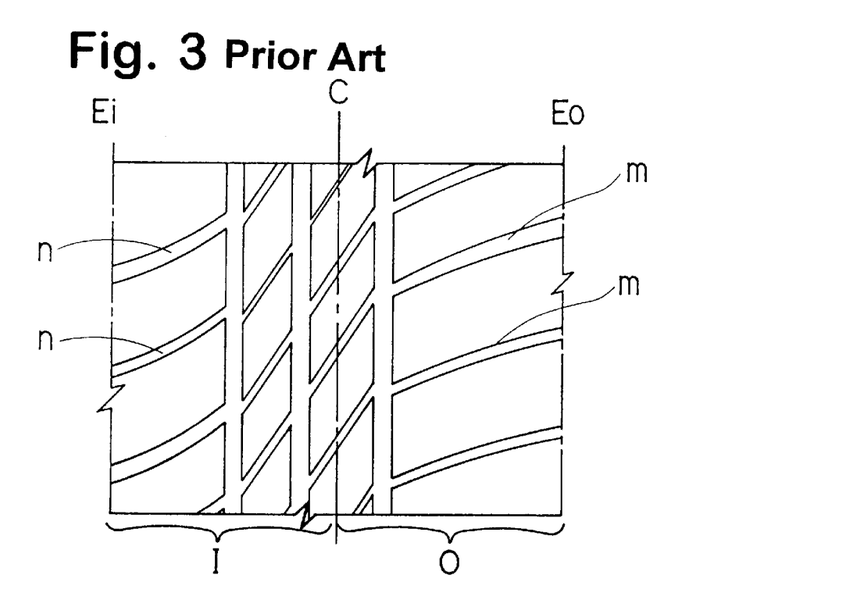

With regard to tire noise, especially noise sound generated when the steering wheel is swung right and left, two types of tread patterns where compared. First, a tread pattern comprising oblique grooves (m) disposed in the exterior half O and oblique grooves (n) disposed in the interior half I are inclined in the same direction, as shown in FIG. 3. Second, and a tread pattern in which the inclining directions are reversed as shown in FIG. 1. As a result, it was found that the tread pattern comprising the oblique grooves inclined in the same direction as shown in FIG. 3 has a disagreeable difference in noise sound level between a right turn and a left turn. However, in the tread pattern comprising the reversely inclined oblique grooves 9, 10 as shown in FIG. 1, the noise difference between a right turn and a left turn is very small and the noise sound level is greatly decreased.

Figure 4:
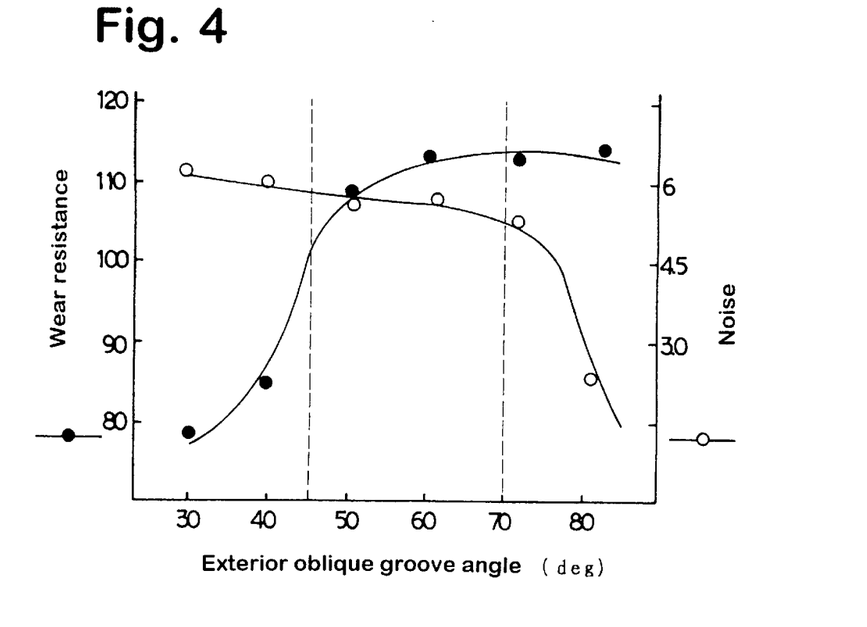
FIG. 4 is a graph showing relationships between the angle of the exterior oblique grooves and the wear resistance and noise performance.

In order to confirm that the inclination angle of the exterior oblique grooves 9 affects the exterior shoulder portion 5 wear resistance, the wear resistance and also tire noise was measured by changing the inclination angle. As shown in FIG. 4, when the inclination angle is less than 40 degrees, the rigidity of the exterior shoulder portion 5 greatly decreases and the wear resistance becomes poor. When the angle is more than 70 degrees, pumping noise originating from the oblique grooves increases. Therefore, the angle θ of the exterior oblique grooves 9 is preferably set in the range of 45 to 70 degrees, more preferably 50 to 70 degrees.

The uneven wear in the exterior shoulder portion 5 was measured after running 3000 km on dry roads. In the graph, the wear is indicated by an index where a passing mark is not less than 100. The tire noise was evaluated by the driver's feeling into ten ranks where a passing mark is not less than five.

Figure 5:
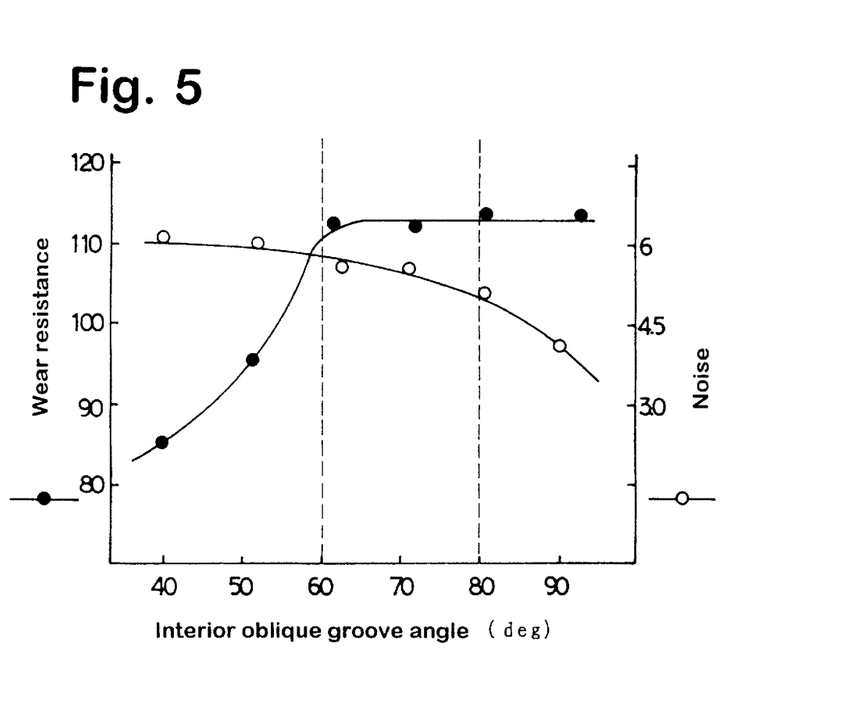
FIG. 5 is a graph showing relationships between the angle of the interior oblique grooves and the wear resistance and noise performance.

The inclination angle of the interior oblique grooves 10 less affects the wear resistance of the interior shoulder portion 7, because the wear energy is relatively small. FIG. 5 shows the results of tests in which the wear resistance of the interior shoulder portion 7 and tire noise were measured by changing the inclination angle of the interior oblique grooves 10. When the inclination angle is less than 50 degrees, the rigidity of the interior shoulder portion 7 decreases and the wear resistance becomes poor. When the angle is more than 80 degrees, the noise performance becomes worse. Therefore, the angle θ 3 of the interior oblique grooves 10 is set in the range of 60 to 80 degrees, more preferably 60 to 75 degrees.

Figure 6:
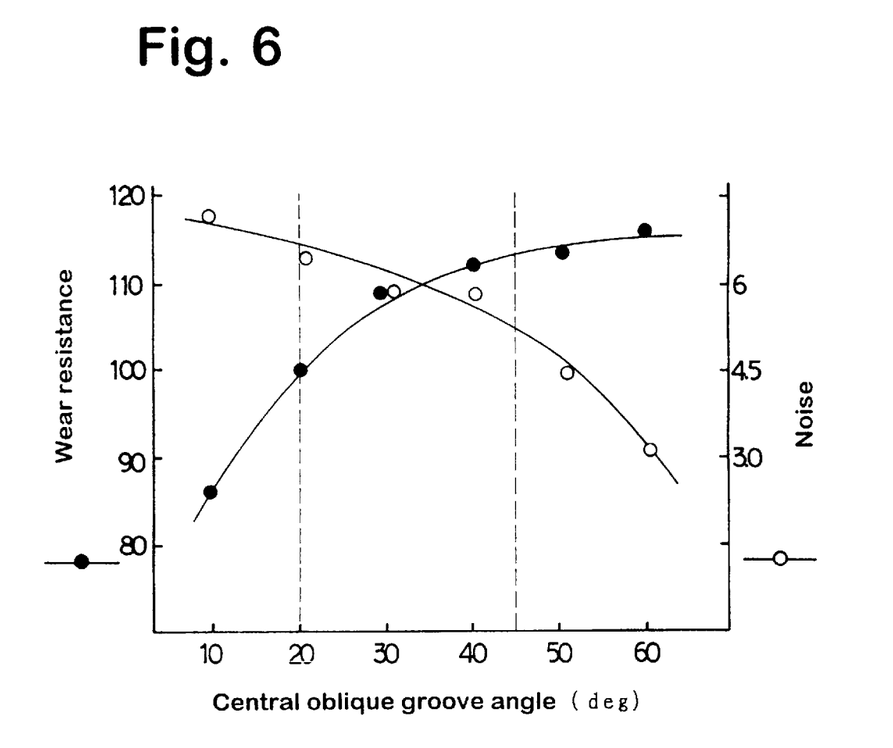
FIG. 6 is a graph showing relationships between the angle of the central oblique grooves and the wear resistance and noise performance.

Similarly, to confirm that the inclination angle of the central oblique grooves 11 affects the wear resistance of the crown portion 6, the wear resistance of the crown portion and also tire noise performance were measured by the inclination angle. As shown in FIG. 6, when the angle is less than 20 degrees, the so called heel/toe wear increases in the crown portion 6 and the wear resistance becomes poor. When the angle is more than 45 degrees, the noise performance is greater deteriorated. Therefore, the angle θ 2 is set in the range of from 20 to 45 degrees, more preferably 20 to 35 degrees.

The inclination angles of the oblique grooves 9, 10 and 11 may be constant along the length, but they are preferably changed. In this example, from the ground contact edge Ei of the interior half portion to the ground contact edge Eo of the exterior half portion, the oblique grooves are increased in the inclination angles as shown in FIG. 7.

The oblique grooves 9, 10 and 11 preferably have a groove width of 2 to 6 mm, and a groove depth not less than 5 mm.

Figure 8:
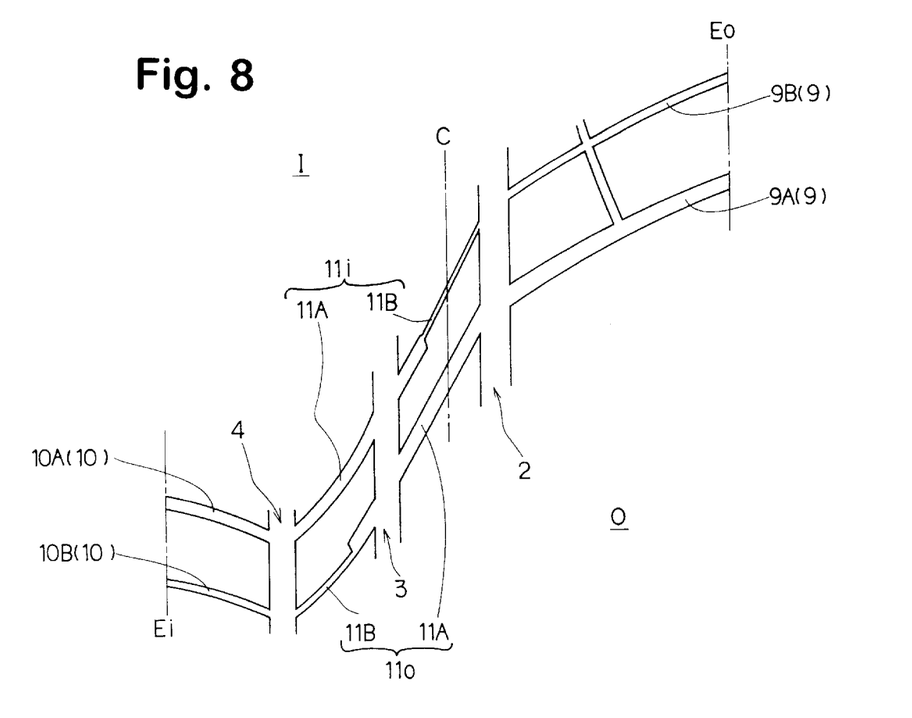
FIG. 8 is a view showing paired oblique grooves.

In this example, as shown in FIG. 8, the central oblique grooves 11 comprise grooves 11i and grooves 11o alternately arranged, in the tire circumferential direction, wherein each of the groove 11i has a wider part 11A on the side of the interior half portion I and a narrow part 11B on the side of the exterior half portion O, and each of the grooves 11o has a wide part 11A on the side of the exterior half portion O and a narrow part 11B on the side of the interior half portion I.

Further, the exterior oblique grooves 9 comprise wide grooves 9A and narrow grooves 9B alternately disposed in the tire circumferential direction.

Also, the interior oblique grooves 10 comprise wide grooves 10A and narrow grooves 10B alternately disposed in the tire circumferential direction.

The ratio (GL/GS) of the large groove width GL and small groove width GS of the oblique grooves 9, 10 and 11 is preferably 1.3 to 3.5, more preferably 1.5 to 2.5.

The wide exterior oblique grooves 9A was disposed such that the axially inner end is positioned on an extension of the wide part 11A of the central oblique groove 11o. The narrow interior oblique grooves 10B are disposed such that the axially inner end aligns with the axially outer end of the narrow part 11B in the tire axial direction. The narrow exterior oblique grooves 9B are disposed such that the axially inner end is positioned on an extension of the narrow part 11B of the central oblique groove 11i. The wide interior oblique grooves 10A are disposed such that the axially inner end aligns with the axially outer end of the wide part 11A in the tire axial direction. By disposing the wide and narrow oblique grooves, the pattern noise generated by the oblique grooves is dispersed in a wide frequency range and the tire noise is further improved. If oblique grooves having the same width are disposed, it is difficult to achieve both increased wet performance and decreased tire noise.

In this example, further, second oblique grooves 13 are disposed in the exterior shoulder portion 5. Each of the second oblique grooves 13 extends between the same kind of oblique grooves 9, for example between the narrow grooves 9B, and they are inclined reversely to the oblique grooves 9 whereby the exterior half portion O can be improved in wet performance. The second oblique grooves 13 are inclined at an angle θ 4 of 15 to 35 degrees to the circumferential direction. The groove width is less than that of the circumferential main groove, 2 to 6 mm for example, and the groove depth is not less than 5 mm. If the second oblique grooves 13 are inclined in the same direction as the oblique grooves 9, the wheeling noise sound increases.

In this example, each of the second oblique grooves 13 is composed of a wide groove 13A and a narrow groove 13B aligned with each other so as to continue from a narrow groove 9B to a narrow groove 9B. The wide grooves 13A and narrow grooves 13B are alternately disposed around the circumference of the tire, which helps to improve the dispersion of the pattern noise.

The blocks B in the shoulder portions 5 and 7 and crown portion 6 can be provided with sipes S having substantially zero width to optimize the block rigidity. In this example, each sipe S is inclined in the same direction as the oblique grooves which define the block B provided with the sipe S.

Comparison Tests

Pneumatic tires of size 205/65R15 were made and tested for wet performance, wear resistance and noise performance.

Wet Performance Test

A 3000 cc rear-wheel-drive car provided on all wheels with test tires was run on a wet asphalt road of a test course, and wet performance was evaluated by the driver's feeling. The results are indicated in Table 1 by an index based on the prior art tire 1 being 100. The larger the value, the better the performance.

Wheel Rim: 6.5JJ standard rim

Inner pressure: front=rear=2.0 kgf/cm$^2$

Wear Resistance Test

The above-mentioned test car was run for 3000 km (including expressway), and the difference between the maximum wear in the exterior half and the maximum wear in the interior half was measured as wear resistance. The results are indicated in Table 1 by an index based on the prior art tire 1 being 100. The larger the value, the higher the resistance.

Noise Performance Test

The test car was coasted on a smooth road surface at a speed 50 km/h and the sound level in dB(A) of overall noise was measured near the inside ear of the driver and in the center of the rear seat. The wheeling noise sound level was evaluated by the driver's feeling swinging the steering wheel right and left, and the noise difference between the right wheeling and left wheeling was also evaluated. The results are indicated by an index based on the prior art tire 1 being 100. The larger the value, the better the noise performance.

TABLE 1

| Tire | Prior | Ex. 1 | Ex. 2 | Ex. 3 | Ex. 4 | Ex. 5 | Ref. |
|---|---|---|---|---|---|---|---|
| Tread pattern | FIG. 2 | FIG. 1 | FIG. 1 | FIG. 1 | FIG. 1 | FIG. 1 | FIG. 3 |
| Main groove arrangement*[1] | sym. | asym. | asym. | asym. | asym. | asym. | asym. |

TABLE 1-continued

| Tire | Prior | Ex. 1 | Ex. 2 | Ex. 3 | Ex. 4 | Ex. 5 | Ref. |
|---|---|---|---|---|---|---|---|
| Exterior main groove | (I) | | | | | | |
| width (mm) | 7.2 | 8.6 | 8.6 | 8.6 | 8.6 | 8.6 | 8.6 |
| depth (mm) | 10.0 | 10.0 | 10.0 | 10.0 | 10.0 | 10.0 | 10.0 |
| distance from equator (mm) | 40.0 | 10.0 | 10.0 | 10.0 | 10.0 | 10.0 | 10.0 |
| Axially inner interior main groove | (g) | | | | | | |
| width (mm) | 8.6 | 7.2 | 7.2 | 7.2 | 7.2 | 7.2 | 7.2 |
| depth (mm) | 10.0 | 10.0 | 10.0 | 10.0 | 10.0 | 10.0 | 10.0 |
| distance from equator (mm) | — | 15.0 | 15.0 | 15.0 | 15.0 | 15.0 | 15.0 |
| Axially outer interior main groove | (h) | | | | | | |
| width (mm) | 7.2 | 7.2 | 7.2 | 7.2 | 7.2 | 7.2 | 7.2 |
| depth (mm) | 10.0 | 10.0 | 10.0 | 10.0 | 10.0 | 10.0 | 10.0 |
| distance from equator (mm) | 40.0 | 47.0 | 47.0 | 47.0 | 47.0 | 47.0 | 47.0 |
| Exterior oblique groove | | | | | | | |
| width (mm) | 4.0 | 4.0 | 4.0 | 3.0 | 6.0 | 3.0/6.0 | 4.0 |
| inclination angle β1 (deg) | 60 | 60 | 45 | 60 | 60 | 60 | 60 |
| Central oblique groove | | | | | | | |
| width (mm) | 2.0 | 2.0 | 2.0 | 1.0 | 3.0 | 1.0/3.0 | 2.0 |
| inclination angle β2 (deg) | 23 | 40 | 25 | 23 | 23 | 23 | 23 |
| Interior oblique groove | | | | | | | |
| width (mm) | 4.0 | 4.0 | 4.0 | 3.0 | 6.0 | 3.0/6.0 | 4.0 |
| inclination angle β3 (mm) | −67 | −75 | −65 | −67 | −67 | −67 | −67 |
| Exterior second oblique groove | | | | | | | |
| width (mm) | — | — | — | 3.0 | 3.0 | 1.0/3.0 | — |
| inclination angle β4 (deg) | | | | −20 | −20 | −20 | |
| Wet performance | 100 | 106 | 107 | 107 | 111 | 110 | 105 |
| Wear resistance | 100 | 107 | 105 | 106 | 104 | 107 | 105 |
| Pass-by Noise | 100 | 101 | 104 | 105 | 102 | 106 | 100 |
| Wheeling Noise | 100 | 104 | 104 | 104 | 104 | 104 | 94 |

*¹sym. = symmetrical arrangement
asym. = asymmetrical arrangement
Tread width = 170 mm
The distance from equator was measured axially to the axially inner edge of the main groove.
In Ex. 5, wide and narrow oblique grooves were alternately disposed in the tire circumferential direction as shown in FIG. 8.

As described above, the three main grooves are disposed asymmetrically. Accordingly, the tread rigidity becomes higher in the exterior half than the interior half. Therefore, although the wear energy is larger in the exterior half than the interior half, uneven wear is effectively prevented while improving the steering stability.

Further, since the central oblique grooves and the exterior oblique grooves are inclined in the same direction, the dewatering from the crown portion and exterior shoulder portion is improved.

Furthermore, since the interior oblique grooves are inclined reversely to the exterior oblique grooves, the difference in the wheeling noise sound between right wheeling and left wheeling is reduced.

Since the exterior shoulder portion, crown portion and interior shoulder portion are divided into blocks, and no circumferential main groove is disposed in a region extending axially inwardly from the ground contact edge of the exterior half by a distance of ⅓ of the tread width, the wear resistance is improved by the pattern rigidity increased in the exterior half. At the same time, an excellent wet performance of a block pattern can be obtained The exterior second oblique grooves, which are inclined reversely to the exterior oblique grooves, improve the wet performance without decreasing the pattern rigidity in the exterior half.

The present invention can be suitably applied to belted radial tires for passenger cars.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pneumatic tire comprising:
   a tread portion, said tread portion having an exterior half and an interior half, said tread portion being provided with only three straight main grooves extending continuously in the tire circumferential direction;
   the three main grooves being arranged asymmetrically about the tire equator and including:
   an exterior main groove disposed in said exterior half; and
   an axially inner main groove and an axially outer main groove disposed in said interior half;
   exterior oblique grooves disposed axially outside the exterior main groove and inclined at an angle θ 1 of 45 to 70 degrees with respect to the circumferential direction of the tire;
   interior oblique grooves disposed axially outside the axially outer main groove and inclined in a direction opposite to the direction of inclination of the exterior oblique grooves at an angle θ 3 of 60 to 80 degrees with respect to the circumferential direction;

central oblique grooves extending from the exterior main groove to the axially outer main groove and inclined in the same direction as the exterior oblique grooves, between the exterior main groove and the axially inner main groove, an angle $\theta 2$ of the central oblique grooves being in the range of 20 to 45 degrees with respect to the circumferential direction; and at an intersection of said central oblique grooves and said axially outer main groove, the angle of the central oblique grooves being greater than 45 degrees with respect to the circumferential direction.

2. The pneumatic tire according to claim 1, wherein the interior oblique grooves comprise wide grooves and narrow grooves alternately disposed in the circumferential direction of the tire.

3. The pneumatic tire according to claim 1, wherein the central oblique grooves comprise wide grooves and narrow grooves alternately disposed in the circumferential direction of the tire.

4. The pneumatic tire according to claim 1, wherein the exterior oblique grooves comprise wide grooves and narrow grooves alternately disposed in the circumferential direction of the tire.

5. The pneumatic tire according to claim 1, wherein the tread portion is provided axially outside the exterior main groove with second exterior oblique grooves being inclined in a direction opposite to the direction of inclination of said exterior oblique grooves and extending between the exterior oblique grooves.

6. The pneumatic tire according to claim 1, wherein no circumferential groove is disposed in a region of ⅓ of the tread width from the ground contact edge of the exterior half.

* * * * *